US006394358B1

(12) United States Patent
Thaxton et al.

(10) Patent No.: US 6,394,358 B1
(45) Date of Patent: May 28, 2002

(54) DEVICE FOR AUTHENTICATING A SECURITY DOCUMENT

(75) Inventors: Daniel D. Thaxton, New Lebanon; William H. Mowry, Jr., Dayton, both of OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/524,441

(22) Filed: Mar. 14, 2000

Related U.S. Application Data

(63) Continuation-in-part of application No. 09/291,537, filed on Apr. 14, 1999, now Pat. No. 6,209,923.

(51) Int. Cl.[7] ................................................ G06K 19/06

(52) U.S. Cl. ........................ 235/494; 235/454; 235/379; 235/380

(58) Field of Search .............................. 283/72, 74, 93; 735/454, 494, 375; 713/186

(56) References Cited

U.S. PATENT DOCUMENTS

| | | | |
|---|---|---|---|
| 4,360,548 | A | 11/1982 | Skees et al. |
| 4,579,370 | A | 4/1986 | Corwin et al. |
| 4,588,211 | A | 5/1986 | Greene |

(List continued on next page.)

FOREIGN PATENT DOCUMENTS

| | | | |
|---|---|---|---|
| EP | 0 493 053 | A2 | 1/1992 |
| EP | 0 469 868 | A2 | 5/1992 |
| WO | WO 98/22292 | | 5/1998 |

OTHER PUBLICATIONS

Article from The Adams Chronicle, "CSPI Increases R & D", Nov. 15, 1995, pp. 8–9.

Article from Today's News, "Xerox Expands Lasertechnics Access to Security Software: Banking and Medical Cards Key Applications for Biometric Security", pp. 1–2.

*Primary Examiner*—Karl D. Frech
*Assistant Examiner*—Ahshik Kim
(74) *Attorney, Agent, or Firm*—Killworth, Gottman, Hagan & Schaeff, L.L.P.

(57) ABSTRACT

A security document and a device for authenticating the security document are provided. The device for authenticating the security document comprises an optical imaging device and a specially programmed controller. The security document comprises a unique combination of covert triggers, overt triggers, and overt secure document indicators arranged to enhance the security of the document at issue and enable high speed machine authentication of the document at issue. In accordance with one embodiment of the present invention, a device for authenticating a security document is provided. The security document includes a security image printed on a face thereof. The security image is defined by a collection of security image elements and defines at least one document authentication scheme. The document authentication scheme is arranged to provide a primary indication of document authenticity. The authentication device comprises an optical imaging device and a specially programmed controller. The optical imaging device is arranged to generate a security image signal representative of at least a portion of the security image. The controller is programmed to (i) define an authentication constellation within the security image, wherein the authentication constellation defines a set of constellation pixels, and wherein the constellation pixels are arranged at predetermined coordinates within the security image; (ii) identify respective occupation characteristics of each of the constellation pixels based on the security image signal, wherein each of the respective occupation characteristics represents a degree of printed matter within a selected constellation pixel; and (iii) determine whether the respective identified occupation characteristics correspond to an authentic document by comparing the respective identified occupation characteristics to a set of authentic occupation characteristics.

22 Claims, 8 Drawing Sheets

U.S. PATENT DOCUMENTS

| | | | | | |
|---|---|---|---|---|---|
| 4,846,502 | A | | 7/1989 | Chang et al. | |
| 4,972,471 | A | | 11/1990 | Gross et al. | |
| 5,091,966 | A | | 2/1992 | Bloomberg et al. | |
| 5,128,525 | A | | 7/1992 | Stearns et al. | |
| 5,131,049 | A | | 7/1992 | Bloomberg et al. | |
| 5,149,140 | A | | 9/1992 | Mowry, Jr. et al. | |
| 5,157,726 | A | | 10/1992 | Merkle et al. | |
| 5,168,147 | A | | 12/1992 | Bloomberg | |
| 5,197,765 | A | | 3/1993 | Mowry, Jr. et al. | |
| 5,209,515 | A | | 5/1993 | Dotson et al. | |
| 5,250,492 | A | | 10/1993 | Dotson et al. | |
| 5,291,243 | A | | 3/1994 | Heckman et al. | |
| 5,315,098 | A | | 5/1994 | Tow | |
| 5,325,167 | A | | 6/1994 | Melen | |
| 5,340,159 | A | | 8/1994 | Mowry, Jr. | |
| 5,396,559 | A | * | 3/1995 | McGrew | 380/54 |
| 5,436,974 | A | | 7/1995 | Kovanen | |
| 5,445,418 | A | | 8/1995 | Blend | |
| 5,483,602 | A | | 1/1996 | Stenzel et al. | |
| 5,611,575 | A | | 3/1997 | Petrie | |
| 5,621,515 | A | | 4/1997 | Hoshion et al. | |
| 5,621,810 | A | | 4/1997 | Suzuki et al. | |
| 5,636,292 | A | | 6/1997 | Rhoads | |
| 5,644,352 | A | | 7/1997 | Chang et al. | |
| 5,647,010 | A | * | 7/1997 | Okubo et al. | 382/100 |
| 5,673,338 | A | | 9/1997 | Denenberg et al. | |
| 5,694,229 | A | | 12/1997 | Drinkwater et al. | |
| 5,698,296 | A | | 12/1997 | Dotson et al. | |
| 5,712,731 | A | | 1/1998 | Drinkwater et al. | |
| 5,757,521 | A | | 5/1998 | Walters et al. | |
| 5,785,353 | A | * | 7/1998 | Diamond | 283/67 |
| 5,790,932 | A | | 8/1998 | Komaki et al. | |
| 5,822,660 | A | | 10/1998 | Wen | |
| 5,832,227 | A | | 11/1998 | Anderson et al. | |
| 5,843,564 | A | | 12/1998 | Gasper et al. | |
| 5,848,426 | A | * | 12/1998 | Wang et al. | 707/505 |
| 5,854,197 | A | | 12/1998 | Mowry, Jr. et al. | |
| 5,864,623 | A | * | 1/1999 | Messina et al. | 380/23 |
| 5,868,902 | A | | 2/1999 | Howland et al. | |
| 5,912,205 | A | | 6/1999 | Lakes et al. | |
| 5,951,055 | A | | 9/1999 | Mowry, Jr. | |
| 5,983,347 | A | | 11/1999 | Brinkmeyer et al. | |
| 5,995,638 | A | * | 11/1999 | Amidror et al. | 382/100 |
| 6,001,510 | A | | 12/1999 | Meng et al. | |
| 6,176,427 | B1 | * | 1/2001 | Antognini et al. | 235/454 |
| 6,209,923 | B1 | * | 4/2001 | Thaxton et al. | 283/72 |

OTHER PUBLICATIONS

Welch Allyn Image Team 9000 OEM Linear Image Engine (IT9000E) & Linear Image Transport (IT9000T), pp. 1–6, Nov. 17, 1999.

Research Development & Manufacturing Corporation, RDM EC5000i—Financial Document Image and MICR Capture—Enabling ACH Check Conversion, 1998.

Welch Allyn Data Collection Products, Imageteam 4400HD/HD10—Hand Held 2D Image Readers, Nov. 19, 1999.

* cited by examiner

DEVICE FOR AUTHENTICATING A SECURITY DOCUMENT

CROSS REFERENCE TO RELATED APPLICATIONS

This application is a Continuation-in-Part of U.S. patent application Ser. No. 09/291,537, filed Apr. 14, 1999 now U.S. Pat. No. 6,209,923.

BACKGROUND OF THE INVENTION

The present invention relates to security documents and, more particularly, to security documents including enhanced means for authenticating the security document.

Conventional security documents, e.g., the void pantograph security documents and the varying tone security documents of U.S. Pat. Nos. 4,579,370, 5,149,140, 5,197,765, 5,340,159, incorporate a security image designed to provide an indication of document authenticity on an attempted duplicate of the document. Often, the nature of the document authentication scheme is described in fine print along the top or bottom of the document—"CASH ONLY WHEN THE COLORED AREA OF THIS DOCUMENT CHANGES GRADUALLY AND EVENLY FROM DARKER TO LIGHTER WITH THE DARKER AREA AT THE TOP" or "THE FACE OF THIS CHECK HAS A SECURITY VOID BACKGROUND PATTERN—DO NOT CASH IF VOID IS VISIBLE." Unfortunately, these printed messages are readily apparent and can be very useful to a potential counterfeiter. Further, these printed message do little to enhance the security of the document on which they are printed and are typically not well-suited for high speed machine authentication.

Accordingly, there is a need for a security document that eliminates the need for readily apparent printed descriptions of the authentication schemes embodied in a document. Further, there is continuing need for security documents incorporating enhanced security features that are well-suited for high speed machine authentication. Finally, there is a need for a device for authenticating such a document.

BRIEF SUMMARY OF THE INVENTION

This need is met by the present invention wherein a security document and a device for authenticating the security document are provided. The device for authenticating the security document comprises an optical imaging device and a specially programmed controller. The security document comprises a unique combination of covert triggers, overt triggers, and overt secure document indicators arranged to enhance the security of the document at issue and enable high speed machine authentication of the document at issue.

In accordance with one embodiment of the present invention, a device for authenticating a security document is provided. The security document includes a security image printed on a face thereof. The security image is defined by a collection of security image elements and defines at least one document authentication scheme. The document authentication scheme is arranged to provide a primary indication of document authenticity. The authentication device comprises an optical imaging device and a specially programmed controller.

The optical imaging device is arranged to generate a security image signal representative of at least a portion of the security image. The controller is programmed to (i) define an authentication constellation within the security image, wherein the authentication constellation defines a set of constellation pixels, and wherein the constellation pixels are arranged at predetermined coordinates within the security image; (ii) identify respective occupation characteristics of each of the constellation pixels based on the security image signal, wherein each of the respective occupation characteristics represents a degree of printed matter within a selected constellation pixel; and (iii) determine whether the respective identified occupation characteristics correspond to an authentic document by comparing the respective identified occupation characteristics to a set of authentic occupation characteristics.

The security document may include a covert trigger defined by a set of covert trigger elements on the face of the security document and the controller may be programmed to identify the respective occupation characteristics based on printed matter defined by at least a portion of the covert trigger.

The controller may be programmed to identify the respective occupation characteristics based on printed matter defined by at least a portion of the security image. The security document preferably includes a covert trigger defined on the face of the security document and the controller is preferably programmed to identify the respective occupation characteristics based on printed matter defined by the covert trigger and the security image.

In accordance with another embodiment of the present invention, a device for authenticating a document is provided. The document includes an image printed on a face thereof. The image is defined by a collection of image elements. The authentication device comprises an optical imaging device and a specially programmed controller. The optical imaging device is arranged to generate an image signal representative of at least a portion of the image.

The controller is programmed to (i) define an authentication constellation within the image, wherein the authentication constellation defines a set of constellation pixels, and wherein the constellation pixels are arranged at predetermined coordinates within the image; (ii) identify respective occupation characteristics of each of the constellation pixels based on the image signal, wherein each of the respective occupation characteristics represents a degree of printed matter within a selected constellation pixel; and (iii) determine whether the respective identified occupation characteristics correspond to an authentic document by comparing the respective identified occupation characteristics to a set of authentic occupation characteristics.

In accordance with yet another embodiment of the present invention, a security document is provided comprising a security image and a covert trigger printed on a face of the document. The security image is defined by a collection of security image elements. The security image defines at least one document authentication scheme. The document authentication scheme is arranged to provide an indication of document authenticity. The covert trigger is defined by a collection of trigger elements. The trigger elements are arranged to resemble the security image elements so the covert trigger is not readily apparent on the face of the document. Preferably, the covert trigger elements and the security image elements are constructed of shapes having substantially identical geometry. The document authentication scheme may comprise a scheme selected from a void pantograph, an optically decodable security image, a varying tone security image, and combinations thereof.

The covert trigger may be arranged to provide an indication of document authenticity in addition to the indication of document authenticity provided by the document authentication scheme. If the security document includes at least one variable data field, the covert trigger may define an authentication parameter for the at least one data field. The variable data field may comprise a date field and the authentication parameter defined by the covert trigger may comprise an encoded date. Alternatively, the variable data field may comprise an amount field and the authentication parameter defined by the covert trigger may comprise a maximum amount limit.

The covert trigger may also be arranged to match a predetermined authentication mask or to identify the document authentication scheme.

The security document may further comprise an overt trigger arranged to be visually distinct from the security image elements. The overt trigger may also be arranged to provide an indication of document authenticity or to identify the document authentication scheme. Specifically, the overt trigger may include an encoded identification of the document authentication scheme. Alternatively, the overt trigger arrangement and the covert trigger arrangement may define substantially identical graphical images.

An overt secure document indicator may be arranged to be visually distinct from the security image elements and to provide a readily apparent indication that the document at issue includes enhances security features. The overt secure document indicator may comprise a graphical icon.

A security document according to the present invention may include a pseudo-covert trigger printed on the face of the document. The pseudo-covert trigger may be arranged as a decoy by printing it such that it is more apparent on the face of the document than the covert trigger and such that its elements are arranged to resemble the security image elements to a significantly lesser extent than the collection of trigger elements.

In accordance with yet another embodiment of the present invention, a method of authenticating a security document is provided. The security document at issue includes a security image printed on a face of the document. The security image includes a collection of security image elements and defines at least one document authentication scheme arranged to provide a primary indication of document authenticity. The method comprises the steps of: (i) defining an authentication constellation within the security image, wherein the authentication constellation defines a set of constellation pixels, and wherein the constellation pixels are arranged at predetermined coordinates within the security image; (ii) identifying respective occupation characteristics of each of the constellation pixels, wherein each of the respective occupation characteristics represents a degree of printed matter within a selected constellation pixel; and (iii) determining whether the respective identified occupation characteristics correspond to an authentic document by comparing the respective identified occupation characteristics to a set of authentic occupation characteristics.

A predetermined number of the authentic occupation characteristics may represent a degree of printed matter defined by a covert trigger defined on the face of the security document or by the security image itself. A predetermined number of the authentic occupation characteristics may represent an absence of printed matter within one of the selected constellation pixels. The step of identifying respective occupation characteristics of each of the constellation pixels may be executed by an automated machine.

In accordance with yet another embodiment of the present invention, a method of authenticating a document is provided. The document at issue includes an image printed on a face of the document. The image includes a collection of image elements. The method comprises the steps of: (i) defining an authentication constellation within the image, wherein the authentication constellation defines a set of constellation pixels, and wherein the constellation pixels are arranged at predetermined coordinates within the image; (ii) identifying respective occupation characteristics of each of the constellation pixels, wherein each of the respective occupation characteristics represents a degree of printed matter within a selected constellation pixel; and (iii) determining whether the respective identified occupation characteristics correspond to an authentic document by comparing the respective identified occupation characteristics to a set of authentic occupation characteristics.

In accordance with yet another embodiment of the present invention, a method of producing a security document is provided comprising the steps of: (i) defining a security image including a collection of security image elements, wherein the security image embodies a predetermined document authentication scheme arranged to provide an indication of document authenticity; (i) defining a covert trigger including a collection of trigger elements, wherein the trigger elements are arranged to resemble the security image elements; (ii) defining a trigger mask, wherein the trigger mask is arranged to define respective non-printed portions aligned with each of the trigger elements, and wherein each of the non-printed portions defines a non-printed buffer zone surrounding a corresponding trigger element; (iii) constructing a printed image from each of the security image, the covert trigger, and the trigger mask; and (iv) printing the constructed printed image on a substrate. The security image may include a background image layer, a message layer, a message layer mask, and a camouflage image layer.

Accordingly, it is an object of the present invention to provide an enhanced security document and security document authentication scheme that eliminates the need for printing readily apparent descriptions of a document's security features on the document itself and satisfies the continuing need for security documents incorporating enhanced security features. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
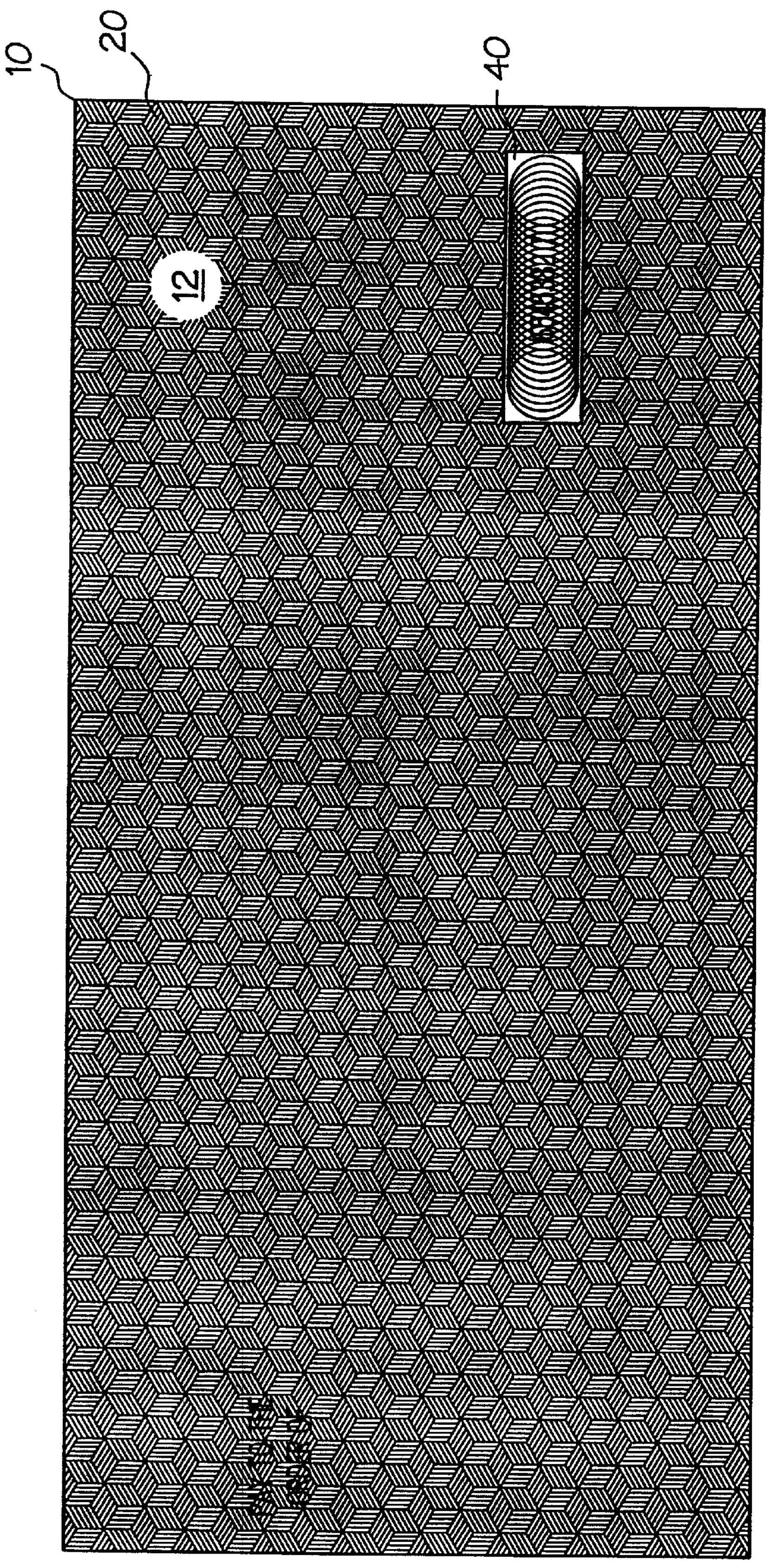
FIG. 1 is a schematic illustration of a security document according to the present invention.

Referring initially to FIG. 1, a security document 10 according to one embodiment of the present invention is illustrated. The security document 10 may be a negotiable instrument or another type of document including particular security features arranged to provide an indication of document authenticity. The illustrated security document includes a security image 20 printed on a front face 12 of the document 10. Although the security image 20 is merely illustrated schematically in FIG. 1, it will be understood by those practicing the present invention and familiar with security documents in general, including those described in U.S. Pat. Nos. 4,579,370, 5,149,140, 5,197,765, 5,340,159, that the security image 20 is defined by a collection of security image elements 22. A set of security image elements 22 are illustrated schematically in FIG. 3.

The security image 20 defines a predetermined document authentication scheme that provides an indication of document authenticity. For example, the security image may be a conventional void pantograph security image, an optically decodable security image, a varying tone security image, some other security image, or combinations thereof. For the purposes of describing and defining the present invention, it is noted that printed matter comprises any type of graphical representations reproduced on a substrate, regardless of the method by which the graphical representation is rendered on the substrate.

Figure 3:
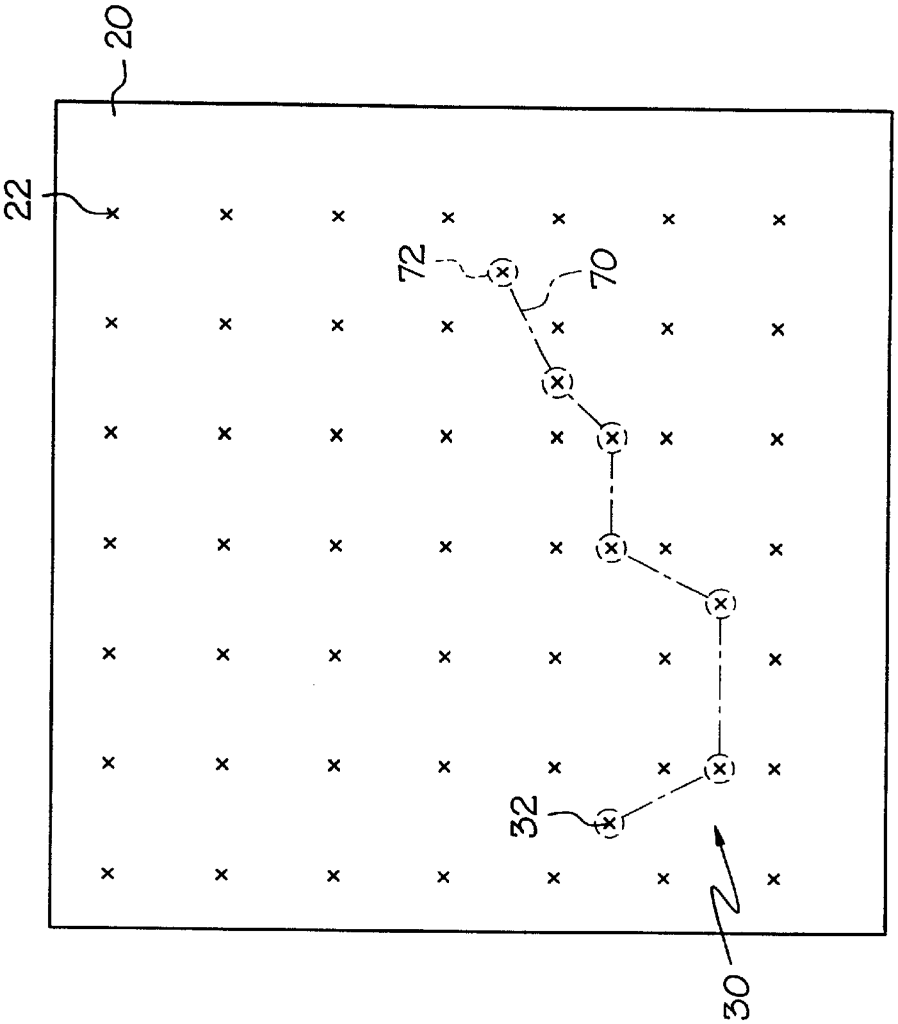
FIGS. 3–6 are illustrations of a covert trigger and a method of document authentication according to the present invention.

Referring now to FIG. 3, a covert trigger 30 is printed on the face 12 of the document 10. The covert trigger 30 is defined by a collection of trigger elements 32 and is referred to herein as a "covert" trigger because the trigger elements 32 are arranged to resemble the security image elements 22 such that the covert trigger 30 is not readily apparent on the face 12 of the document 10. Preferably, the covert trigger elements 32 and the security image elements 22 are constructed of shapes having substantially identical geometry, e.g., printed dots, clusters of printed dots, etc. It is contemplated by the present invention, however, that the covert trigger elements 32 and the security image elements 22 need not be identical. Rather, all that is required is that the covert trigger elements 32 be sized and positioned such that they are substantially hidden within the security image 20 so as not to be readily apparent upon casual inspection of the security document 10. In certain embodiments of the present invention, the covert trigger may be defined by partial printed elements, removed security image elements, or non-printed portions of the security image 20. In other embodiments of the present invention, a plurality of covert triggers 30 are provided across the face 12 of the document 10. The plural covert triggers 30 may be identical or distinct.

The covert trigger 30 may be arranged to provide an indication of document authenticity, to identify the document authentication scheme, or both. If the covert trigger 30 is arranged to provide an indication of document authenticity, that indication of authenticity will typically be in addition to the indication of document authenticity provided by the document authentication scheme.

In one embodiment of the present invention, the covert trigger 30 may be arranged such that it defines an authentication parameter for a data field on the security document 10. Specifically, the shape, appearance, or arrangement of the trigger 30 may be an encoded representation of a predetermined parameter against which the authenticity of the data field may be checked. For example, the variable data field may comprise a printed issue date and the authentication parameter defined by the covert trigger 30 may comprises an encoded expiration date against which the printed date may be checked. In this manner, a security document processor may guard against alteration of the security document issue date by reading the encoded expiration date. As a further example, the variable data field may comprise a printed amount and the authentication parameter defined by the covert trigger 30 may comprise an encoded maximum amount limit. In this manner, a security document processor may guard against alteration of the value of a negotiable document beyond the encoded maximum value.

In another embodiment of the present invention, the covert trigger 30 is arranged to identify the document authentication scheme. Specifically, the arrangement of the covert trigger 30 may be such that it provides an indication as to the nature of the one or more authentication schemes embodied in the security document 10. In this manner, the covert trigger 30 overcomes the disadvantages of merely describing the nature of the document authentication scheme in fine print along the top or bottom of the document—"CASH ONLY WHEN THE COLORED AREA OF THIS DOCUMENT CHANGES GRADUALLY AND EVENLY FROM DARKER TO LIGHTER WITH THE DARKER AREA AT THE TOP" or "THE FACE OF THIS CHECK HAS A SECURITY VOID BACKGROUND PATTERN—DO NOT CASH IF VOID IS VISIBLE."

Referring again to FIG. 1, an overt trigger 40 is provided to further enhance the security document 10. The overt trigger 40 is arranged to be visually distinct from the security image elements such that it is readily viewable on the face 12 of the security document 10. The overt trigger 40 may be arranged to identify the document authentication scheme by defining an encoded identification of the nature of the authentication scheme embodied in the security document 10. For example, the numerals "6545382" printed on the face of the document 10 may correspond to a predetermined security document decoding algorithm or authentication algorithm, i.e., an algorithm that points to a specific machine-readable decoding or authentication scheme. It is contemplated by the present invention that the overt trigger 40 may be positioned in a portion of the document dedicated to the identification of security features embodied in the document 10. The portion of the document dedicated to the identification of security features, i.e., the security features rectangle, may be designated in an industry standard location.

The overt trigger 40 may also be arranged to provide an indication of document authenticity. For example, the overt trigger 40 and the covert trigger 30 may be arranged to define substantially identical graphical images. An indication as to document authenticity could be gleaned from a comparison of the respective graphical images defined by the overt trigger 40 and the covert trigger 30. For example, the covert trigger could be arranged to define the shape of the number "5" or a star shape and the overt trigger could be a printed number "5" or a star.

Figure 2:
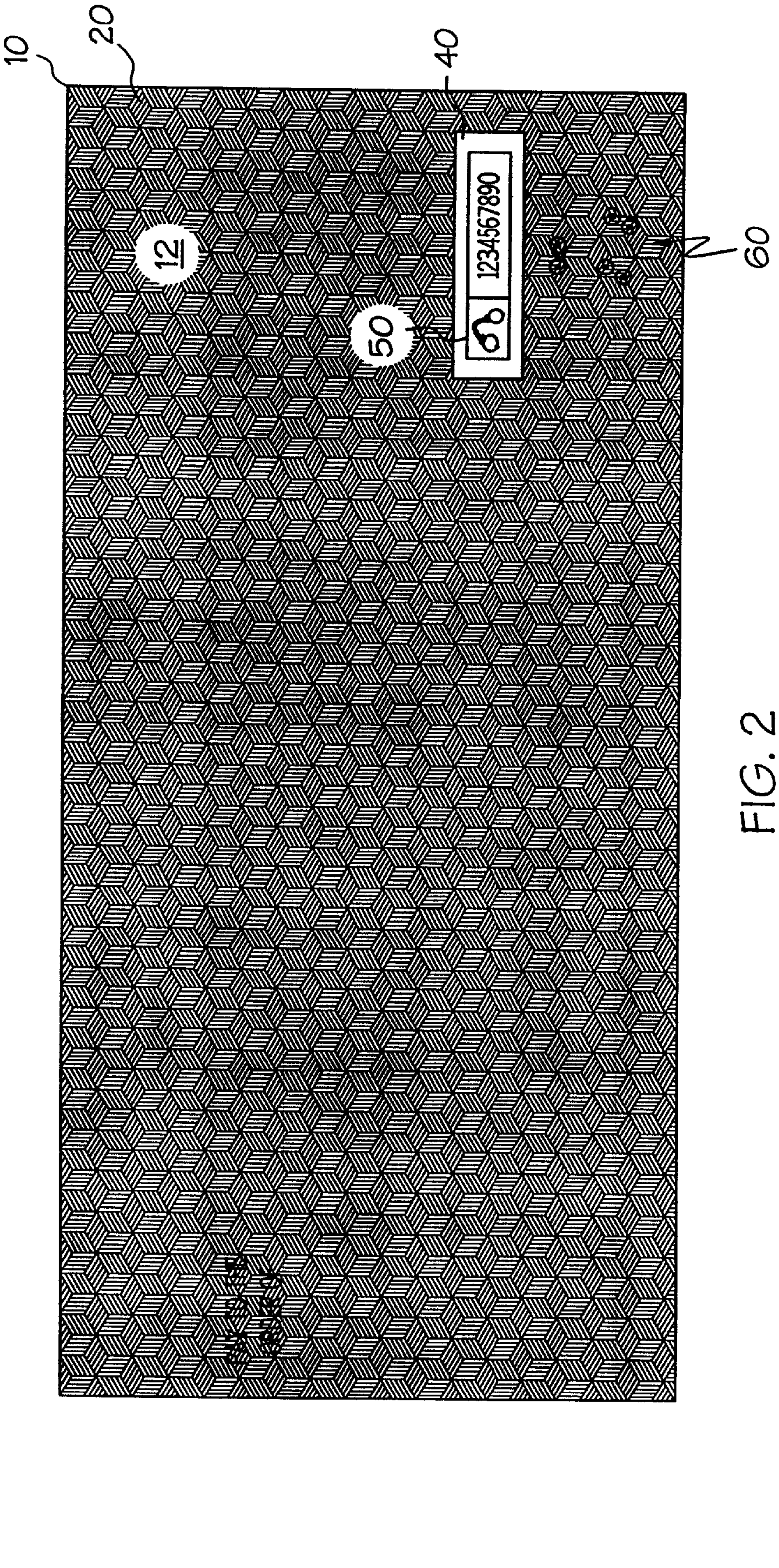
FIG. 2 is a schematic illustration of a security document according to an alternative embodiment of the present invention.

Referring now to FIG. 2, an overt secure document indicator 50 may also be printed on the face 12 of the security document 10 and is arranged to be visually distinct from the security image elements 22 so as to be readily apparent on the face of the document. Preferably, the overt secure document indicator 50 comprises a graphical icon that clearly identifies the document 10 as an enhanced security document. In the illustrated embodiment, for example, the overt secure document indicator 50 comprises a graphical representation of a pair of handcuffs. Other examples include a key, a lock, a chain link or a concertina wire pattern, etc.

Referring further to FIGS. 2 and 3, another aspect of the present invention contemplates the addition of a printed pseudo-covert trigger 60 on the face 12 of the document 10.

The pseudo-covert trigger is arranged to be more apparent on the face 12 of the document 10 than the covert trigger 30 by constructing it of pseudo-covert trigger elements 62 that resemble the security image elements 22 to a significantly lesser extent than the collection of trigger elements 32. In a preferred embodiment of the present invention, the pseudo-covert trigger 60 is utilized as a decoy for the true covert trigger 30. Specifically, a counterfeiter aware of the presence of a covert trigger somewhere on the face 12 of the security document 10 may tend to mistake the pseudo-covert trigger 60 as the covert trigger 30. As a result, the counterfeiter will copy the pseudo-covert trigger 60 instead of the covert trigger 30 and the resulting invalid copy will be identifiable as an invalid document because the covert trigger 30 will not have been copied. As will be appreciated by those practicing the present invention, the pseudo-covert trigger 60 need not convey any particular meaning or be arrange in any specific manner because it is merely a phony trigger. For the purposes of describing and defining the present invention, it is noted that a true trigger is graphical image or collection of printed elements arranged to provide a direct indication of document authenticity or to indicate a means by which a document may be authenticated.

Referring to FIGS. 3–6, various methods of authenticating a security document according to the present invention are illustrated. The security document at issue may or may not include a covert trigger, an overt trigger, a pseudo-covert trigger, or an overt secure document indicator. Rather, the security document at issue may merely include a security image 20 printed on a face of the document. The security image 20, which is illustrated only partially in FIGS. 3–6, is defined by a collection of security image elements 22 and defines at least one document authentication scheme. The document authentication scheme, as is described above, is arranged to provide a primary indication of document authenticity. Initially, the method of authentication comprises the step of defining an authentication constellation 70 within the security image 20. The authentication constellation 70 defines a set of constellation pixels 72 arranged at predetermined coordinates within the security image 20. It is noted that seven constellation pixels 72 are present in the embodiments of FIGS. 3 and 5, ten constellation pixels 72 are present in the embodiment of FIG. 4, and nine constellation pixels 72 are present in the embodiment of FIG. 6.

Figure 4:
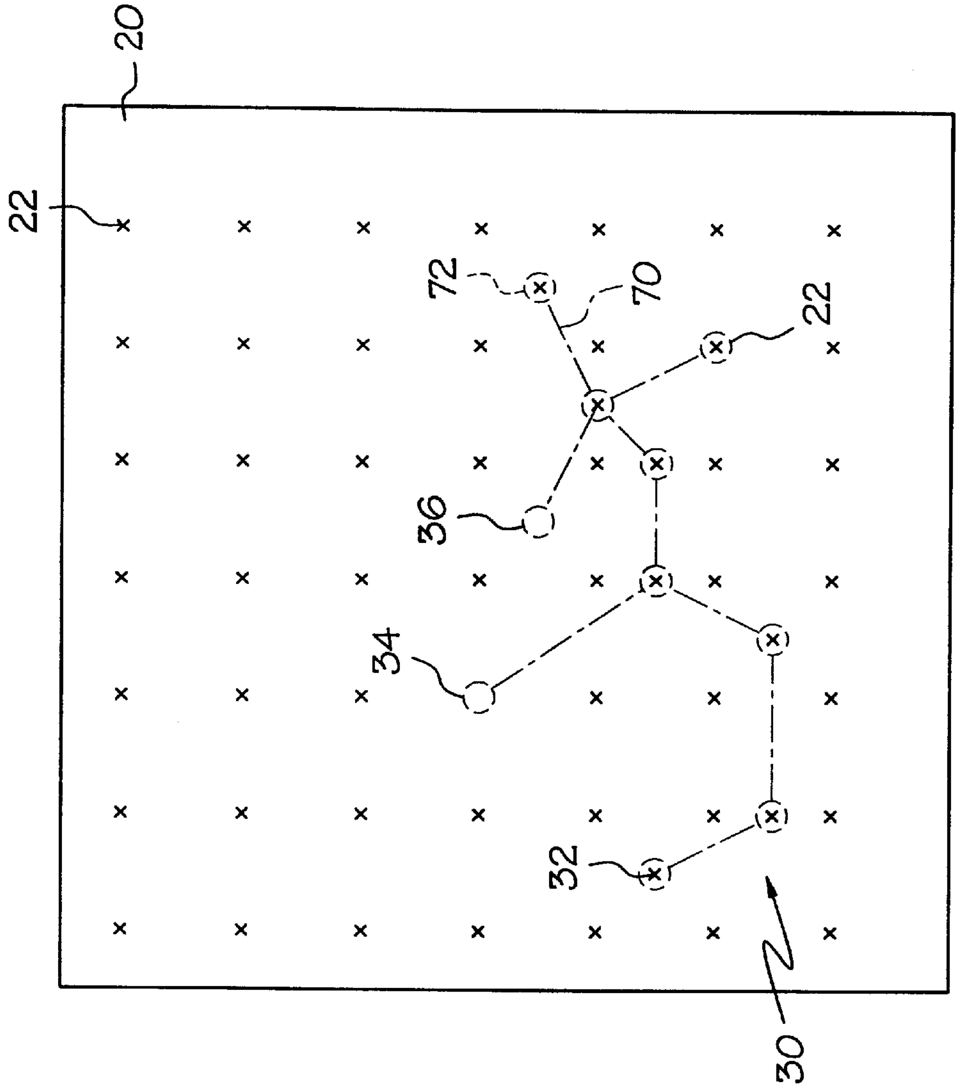
Figure 5:
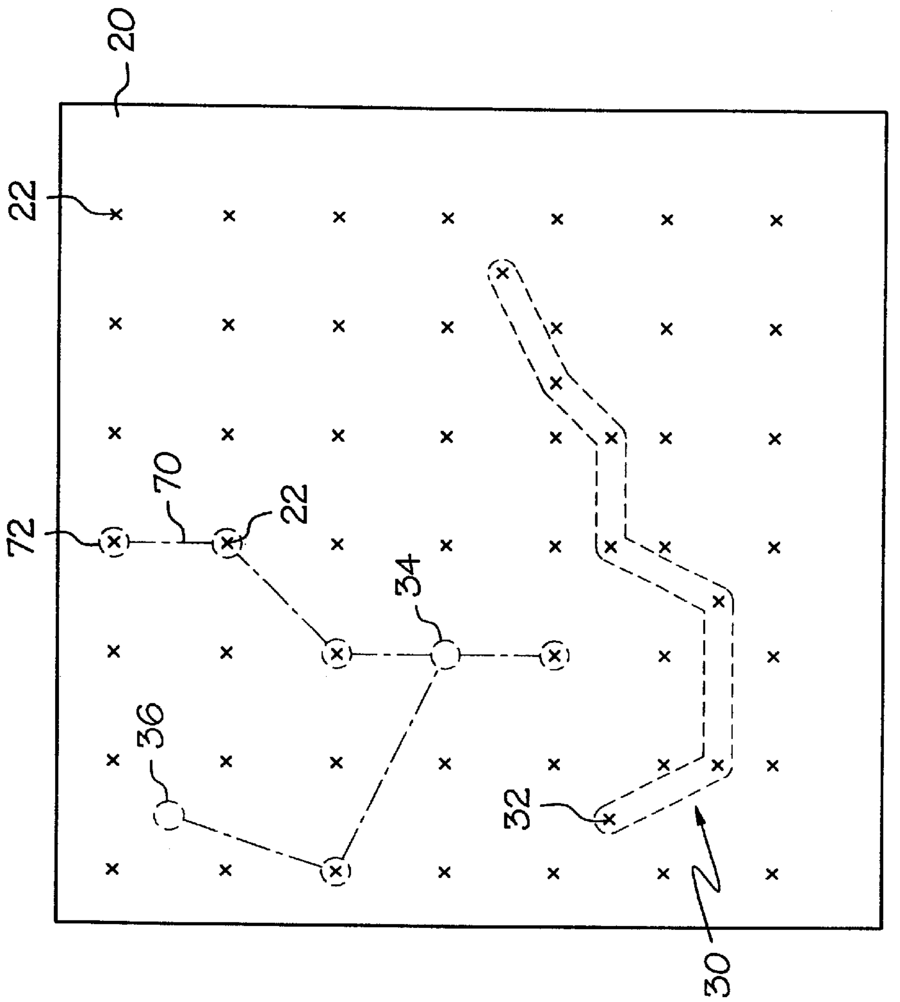
Figure 6:
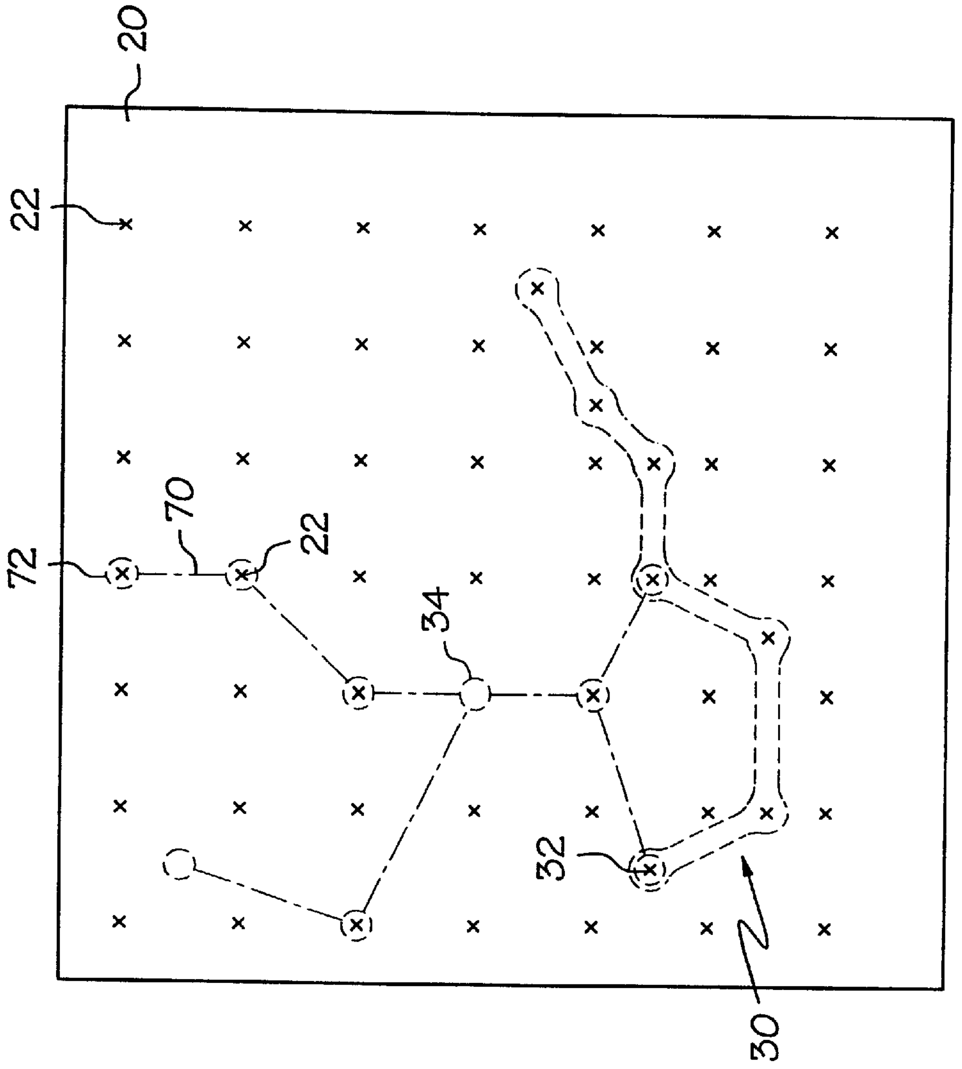

In the embodiment illustrated in FIG. 3, the constellation pixels 72 are positioned to correspond to the positions of the trigger elements 32. However, as is implied above, the constellation pixels 72 need not be positioned to correspond to the positions the trigger elements 32. Rather, as is illustrated in FIGS. 4–6, the constellation pixels 72 may be arranged such that their positions correspond to the locations of security image elements 22 and trigger elements 32 (see FIGS. 4 and 6), removed or missing security image elements 34 (see FIGS. 4–6), other non-printed portions 36 of the security image 20 (see FIGS. 4–6), or other combinations and selections of distinctive portions of printed or non-printed matter on the face of the security document at issue.

Once the authentication constellation 70 is identified, according to the authentication method of the present invention, the respective occupation characteristics of each of the constellation pixels 72 is identified. Each of the respective occupation characteristics represents a measure of the degree of printed matter within a selected constellation pixel 72. The document at issue may then be authenticated based upon a determination of whether the respective occupation characteristics correspond to the predetermined authentic occupation characteristics of a document. As will be appreciated by those practicing the authentication method of the present invention, it will be preferable to establish a degree of tolerance in comparing the respective occupation characteristics with the corresponding predetermined authentic occupation characteristics of a document. For example, it may be preferable to authenticate a document if the 90% of the identified occupation characteristics correspond to the predetermined authentic occupation characteristics.

As is noted above, the covert trigger 30 itself may be arranged to match a predetermined authentication mask defining the authentication constellation 70. For the purposes of defining and describing the present invention, it is noted that the noted "degree of printed matter" includes the case where no printed matter is included within a selected constellation pixel 72.

Figure 8:
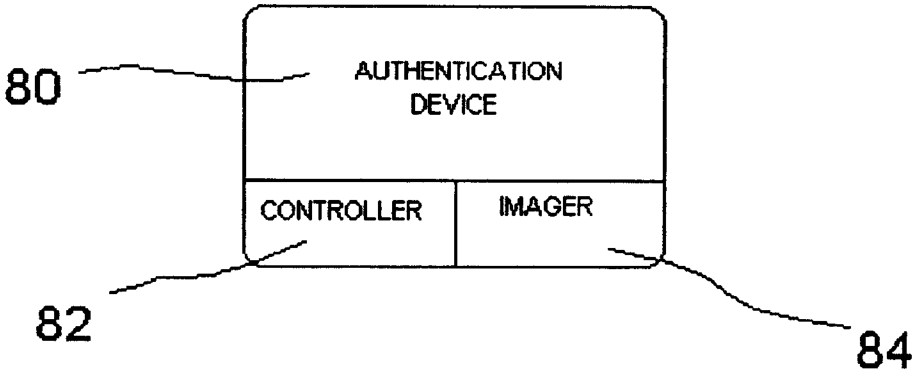
FIG. 8 is a schematic illustration of a device for authenticating a security document according to the present invention.

As is noted above, the step of identifying respective occupation characteristics of each of the constellation pixels may be executed by an automated machine. More specifically, referring to FIG. 8, in accordance with one embodiment of the present invention, a device 80 for authenticating a security document is provided. The authentication device 80 comprises a specially programmed controller 82 and an optical imaging device 84.

The authentication device 80 may be utilized in a variety of applications. For example, the authentication device may be utilized with various types of security document or check processing equipment, like reader/sorters and point of sale terminals, to enable authentication when security documents or checks are in various stages of processing. In preferred embodiments of the present invention, the authentication device 80 is utilized at a check's point of first presentment, e.g., a point of sale terminal or a teller terminal at a banking or check cashing institution. The authentication device 80 may be positioned near or mounted to the check processing equipment. However, in a preferred embodiment of the present invention the authentication device 80 is incorporated directly into the internal structure of the equipment and is arranged to share hardware and software resources with the equipment.

The optical imaging device 84 is arranged to generate a security image signal representative of at least a portion of the security image. Regarding the specific arrangement of the imaging device 84, it is noted that any one of a number of commercially available imaging devices may be modified or adapted in accordance with the teachings of the present invention. Preferably, the device 84 includes a high resolution optics assembly capable of scanning a security document and generating the security image signal with the aid of a suitably programmed controller. Examples of imaging devices that may be arranged for operation according to the present invention include the IT9000E and the IT9000T imagers and the 4400HD/HD10 hand-held image readers available from Welch Allyn data collection Skaneateles Falls, N.Y. and the RDM EC5000i, available from the RDM Corporation, Waterloo, Ontario.

The controller 82 is programmed to define the authentication constellation 70 within the security image 20 and identify respective occupation characteristics of each of the constellation pixels 72 based on the security image signal. The controller 82 is further programmed to determine whether the respective identified occupation characteristics correspond to an authentic document by comparing the respective identified occupation characteristics to a set of authentic occupation characteristics. Where the security document includes a covert trigger 30 the controller 82 is programmed to identify the respective occupation characteristics based on printed matter defined by the covert trigger 30, the security image 20, or combinations thereof.

Figure 7:
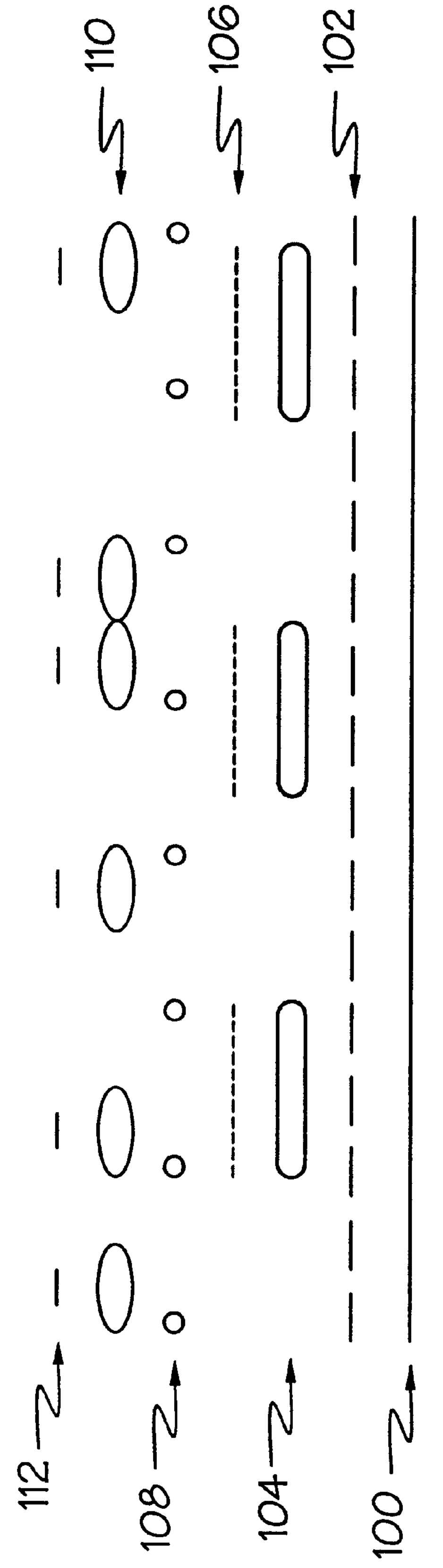
FIG. 7 is an illustration of a method of producing a security document according to the present invention.

Referring now to FIG. 7, a method of producing a security document according to the present invention is illustrated schematically. Initially, a digital security image is defined, typically utilizing suitable graphic design software. The security image includes a collection of security image elements and embodies a predetermined document authentication scheme, referred to above, which is arranged to provide an indication of document authenticity. As is illustrated in FIG. 7, the security image includes: (i) a background image layer 102; (ii) a message layer 106; (iii) a message layer mask 104 defining non-printed areas within the background layer 102 corresponding to the positions of the printed matter within the message layer 106; and (iv) a camouflage image layer 108 further defining non-printed matter arranged to obscure the message layer 106.

A covert trigger layer 112 is also defined and includes a collection of trigger elements. As is noted above, the trigger elements may comprise printed elements, partial printed elements, or non-printed space. In any event, the trigger elements of the covert trigger layer 112 are preferably arranged to resemble the security image. A trigger mask layer 110 is defined and is arranged to define respective non-printed portions aligned with each of the trigger elements in the covert trigger layer 112. Each of the non-printed portions in the trigger mask layer 110 defines a non-printed buffer zone surrounding a corresponding trigger element in the covert trigger layer 112. The buffer zone is most conveniently provided by ensuring that the non-printed portions of the trigger mask layer 110 are aligned with, and uniformly larger than, the trigger elements in the covert trigger layer 112. The buffer zone of the trigger mask layer 110 provides for a margin of error in positioning the elements of the covert trigger layer 112. The image to be printed on the substrate 100 is constructed from the background image layer 102, the message layer 106, the message layer mask 104, the camouflage image layer 108, the trigger mask layer 110, and the covert trigger layer 112.

Having described the invention in detail and by reference to preferred embodiments thereof, it will be apparent that modifications and variations are possible without departing from the scope of the invention defined in the appended claims.

What is claimed is:

1. A device for authenticating a security document, said security document including a security image printed on a face thereof, wherein said security image is defined by a collection of security image elements, wherein said security image defines at least one document authentication scheme, and wherein said document authentication scheme is arranged to provide a primary indication of document authenticity, said authentication device comprising:

an optical imaging device arranged to generate a security image signal representative of at least a portion of said security image; and a controller programmed to define an authentication constellation within said security image, wherein said authentication constellation defines a set of constellation pixels, and wherein said constellation pixels are arranged at predetermined coordinates within said security image;

identify respective occupation characteristics of each of said constellation pixels based on said security image signal, wherein each of said respective occupation characteristics represents a degree of printed matter within a selected constellation pixel; and determine whether said respective identified occupation characteristics correspond to an authentic document by comparing said respective identified occupation characteristics to a set of authentic occupation characteristics.

2. A device for authenticating a security document as claimed in claim 1 wherein said security document includes a covert trigger defined by a set of covert trigger elements on said face of said security document and wherein said controller is programmed to identify said respective occupation characteristics based on printed matter defined by at least a portion of said covert trigger.

3. A device for authenticating a security document as claimed in claim 1 wherein said controller is programmed to identify said respective occupation characteristics based on printed matter defined by at least a portion of said security image.

4. A device for authenticating a security document as claimed in claim 1 wherein said security document includes a covert trigger defined by a set of covert trigger elements on said face of said security document and wherein said controller is programmed to identify said respective occupation characteristics based on printed matter defined by said covert trigger and said security image.

5. A device for authenticating a security document as claimed in claim 1 wherein selected ones of said authentic occupation characteristics represent an absence of printed matter within one of said selected constellation pixels.

6. A device for authenticating a security document as claimed in claim 2 wherein said covert trigger elements and said security image elements are constructed of shapes having substantially identical geometry.

7. A device for authenticating a security document as claimed in claim 1 wherein said document authentication scheme comprises a scheme selected from one or more of a void pantograph, an optically decodable security image, a varying tone security image, and combinations thereof.

8. A device for authenticating a security document as claimed in claim 2 wherein said cover trigger is arranged to provide an indication of document authenticity in addition to the indication of document authenticity provided by said document authentication scheme.

9. A device for authenticating a security document as claimed in claim 8 wherein said security document includes at least one variable data field and wherein said covert trigger defines an authentication parameter for said variable data field.

10. A device for authenticating a security document as claimed in claim 9 wherein said variable data field comprises a date field and wherein said authentication parameter defined by said covert trigger comprises an encoded date.

11. A device for authenticating a security document as claimed in claim 9 wherein said variable data field comprises an amount field and wherein said authentication parameter defined by said covert trigger comprises a maximum amount limit.

12. A device for authenticating a security document as claimed in claim 2 wherein said covert trigger is arranged to match a predetermined authentication mask.

13. A device for authenticating a security document as claimed in claim 2 wherein said covert trigger is arranged to identify said document authentication scheme.

14. A device for authenticating a security document as claimed in claim 2 wherein said covert trigger elements are selected from one or more of a printed element, a partial printed element, and non-printed space.

15. A device for authenticating a security document as claimed in claim 1 wherein said optical imaging device comprises a high resolution optics assembly capable of scanning said security document.

16. A device for authenticating a security document as claimed in claim 1 wherein said optical imaging device is selected from a group comprising a linear imaging device and a hand-held imaging device.

17. A device for authenticating a document, said document including an image printed on a face thereof, wherein said image is defined by a collection of image elements, said authentication device comprising:

an optical imaging device arranged to generate an image signal representative of at least a portion of said image; and a controller programmed to define an authentication constellation within said image, wherein said authentication constellation defines a set of constellation pixels, and wherein said constellation pixels are arranged at predetermined coordinates within said image;

identify respective occupation characteristics of each of said constellation pixels based on said image signal, wherein each of said respective occupation characteristics represents a degree of printed matter within a selected constellation pixel; and determine whether said respective identified occupation characteristics correspond to an authentic document by comparing said respective identified occupation characteristics to a set of authentic occupation characteristics.

18. A security document processor comprising document processing hardware and a device for authenticating a security document, said security document including a security image printed on a face thereof, wherein said security image is defined by a collection of security image elements, wherein said security image defines at least one document authentication scheme, and wherein said document authentication scheme is arranged to provide a primary indication of document authenticity, said authentication device comprising:

an optical imaging device arranged to generate a security image signal representative of at least a portion of said security image; and a controller programmed to define an authentication constellation within said security image, wherein said authentication constellation defines a set of constellation pixels, and wherein said constellation pixels are arranged at predetermined coordinates within said security image;

identify respective occupation characteristics of each of said constellation pixels based on said security image signal, wherein each of said respective occupation characteristics represents a degree of printed matter within a selected constellation pixel; and determine whether said respective identified occupation characteristics correspond to an authentic document by comparing said respective identified occupation characteristics to a set of authentic occupation characteristics.

19. A security document processor as claimed in claim 18 wherein said device for authenticating said security document is mounted to said document processing hardware.

20. A security document processor as claimed in claim 19 wherein said device for authenticating said security document and said document processing hardware share common hardware resources.

21. A security document processor as claimed in claim 19 wherein said device for authenticating said security document and said document processing hardware share common software resources.

22. A device for authenticating a security document, said security document including a security image printed on a face thereof, wherein said security image is defined by a collection of security image elements, wherein said security image defines at least one document authentication scheme, and wherein said document authentication scheme is arranged to provide a primary indication of document authenticity, said authentication device comprising:

an optical imaging device arranged to generate a security image signal representative of at least a portion of said security image; and a controller programmed to define an authentication constellation within said security image, wherein said authentication constellation defines a set of constellation pixels, and wherein said constellation pixels are arranged at predetermined coordinates within said security image;

identify respective occupation characteristics of each of said constellation pixels based on said security image signal, wherein each of said respective occupation characteristics represents a degree of printed matter within a selected constellation pixel; and determine whether said respective identified occupation characteristics correspond to an authentic document.

* * * * *

UNITED STATES PATENT AND TRADEMARK OFFICE

CERTIFICATE OF CORRECTION

PATENT NO. : 6,394,358 B1
DATED : May 28, 2002
INVENTOR(S) : Thaxton et al.

It is certified that error appears in the above-identified patent and that said Letters Patent is hereby corrected as shown below:

Column 4,
Line 21, reads as "authenticity; (i) defining", should read -- authenticity; (ii) defining --.
Line 24, reads as "authenticity; (ii) defining", should read -- authenticity; (iii) defining --.
Line 28, reads as "authenticity; (iii) defining", should read -- authenticity; (iv) defining --.
Line 30, reads as "authenticity; (iv) defining", should read -- authenticity; (v) defining --.

Column 10,
Line 40, reads as "said cover trigger", should read -- said covert trigger --.

Signed and Sealed this

Seventeenth Day of December, 2002

JAMES E. ROGAN
*Director of the United States Patent and Trademark Office*